United States Patent [19]
Caluori et al.

[11] Patent Number: 6,035,757
[45] Date of Patent: Mar. 14, 2000

[54] ROTARY SAW CUT ALIGNMENT DEVICE

[76] Inventors: Raymond Caluori, 140 Wood Rd., Suite 200, Braintree, Mass. 02184; James R. Baird, 82 Hillside Ave., Brockton, Mass. 02402

[21] Appl. No.: 08/990,501

[22] Filed: Dec. 15, 1997

[51] Int. Cl.[7] ........................................... B27B 5/29
[52] U.S. Cl. .................... 83/520; 83/522.23; 30/392
[58] Field of Search .............. 83/520, 521, 482, 83/522.15, 522.23, 522.26, 522.19, 522.21, 676, 663

[56] References Cited

U.S. PATENT DOCUMENTS

| | | | |
|---|---|---|---|
| 4,335,510 | 6/1982 | Close et al. | 30/276 |
| 4,503,740 | 3/1985 | Brand et al. | 83/520 |
| 4,833,782 | 5/1989 | Smith | 83/520 |
| 5,060,384 | 10/1991 | Everts | 30/276 |
| 5,285,708 | 2/1994 | Bosten et al. | 83/520 |
| 5,446,635 | 8/1995 | Jehn | 83/521 |
| 5,630,277 | 5/1997 | Kimura | 83/520 |

OTHER PUBLICATIONS

Northern Hydraulics Catalog, Inc, Mail order catalog "Northern", p. 37, right column, Item A, Flyer #701 (1–800–533–5545), Dec., 1998.

Primary Examiner—Rinaldi I. Rada
Assistant Examiner—Gyounghyun Bae
Attorney, Agent, or Firm—Brian M. Dingman

[57] ABSTRACT

A cut alignment device for a rotary saw having a motor which spins a cutting unit which includes a rotary shaft driven by the motor, a circular blade having a central aperture through which the shaft fits, and a blade mounting device for holding the blade on the shaft, the cut alignment device including: a battery power source carried by the cutting unit; and a beam light source, operatively connected to this power source, and carried by the cutting unit; wherein the light source projects a light beam from the cutting unit directed along the cutting edge of the blade to assist the operator in cutting accurately.

9 Claims, 4 Drawing Sheets

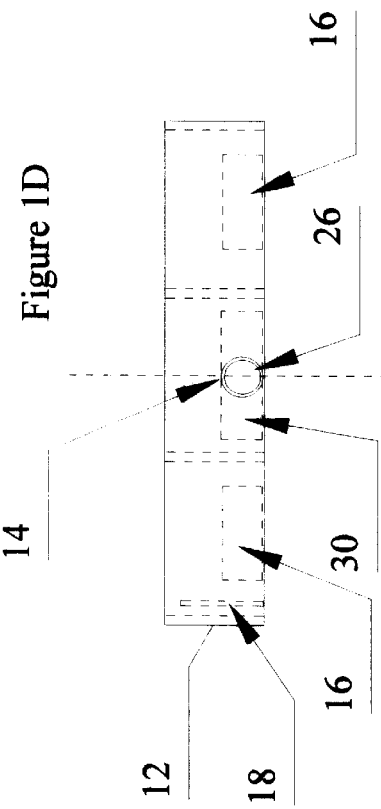
Figure 1B
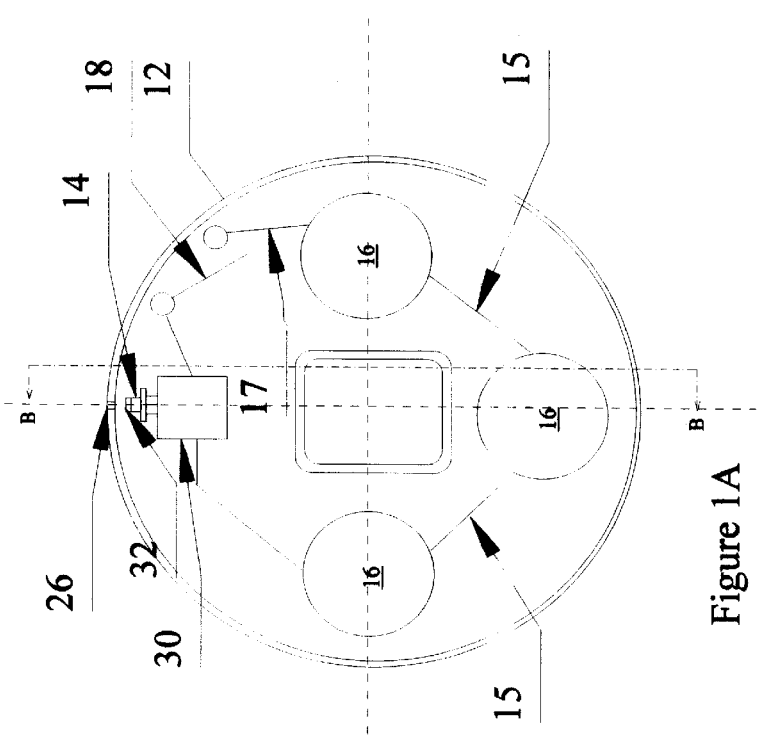
Figure 1D
Figure 1A

ROTARY SAW CUT ALIGNMENT DEVICE

FIELD OF THE INVENTION

This invention relates to a saw-mounted cut alignment device for a rotary saw which projects a line of light along the cut line.

BACKGROUND OF THE INVENTION

Rotary saws such as circular saws, chop saws, radial arm saws, miter saws and table saws require that the operator properly align the material being cut with the saw blade. This takes time and care, but is critical for a proper cut.

There exist laser-based cut alignment devices which are externally mounted in the vicinity of the saw, and project a light beam along the cut line. These devices must be manually aligned before cutting begins, thus requiring experience and additional time. Also, the operator must monitor this additional piece of equipment in order to use the alignment device properly. Accordingly, devices of this nature are not practical for most saw owners and operators.

SUMMARY OF THE INVENTION

It is therefore an object of this invention to provide a cut alignment device for a rotary saw.

It is a further object of this invention to provide such a cut alignment device which is mounted to the saw.

It is a further object of this invention to provide such a cut alignment device which is automatically self-aligning with the blade cut line.

It is a further object of this invention to provide such a cut alignment device which requires no operator set-up.

It is a further object of this invention to provide such a cut alignment device which illuminates a straight line on the material to be cut along the blade cut line.

It is a further object of this invention to provide such a cut alignment device which turns on only when the saw is activated.

It is a further object of this invention to provide such a cut alignment device which decreases the amount of time required for a saw operator to align the material with the cutting edge of the saw blade.

This invention results from the realization that rotary saws can be made more accurate and easier to use with a light-source mounted on the rotating portion of the saw which projects a beam of light along the saw blade cutting line.

This invention features a cut alignment device for a rotary saw having a motor which spins a cutting unit which includes a rotary shaft driven by the motor, a circular blade having a central aperture through which the shaft fits, and a blade mounting device for holding the blade on the shaft, the cut alignment device comprising: a battery power source carried by the cutting unit; and a beam light source, operatively connected to said power source, and carried by the cutting unit; wherein said light source projects a light beam from the cutting unit directed along the cutting edge of the blade to assist the operator in cutting accurately.

The cut alignment device may further include a switch between said power source and said light source for selectively applying power to said light source. The switch may be centrifically engaged to automatically power said light source when the shaft is spinning. The light source may be mounted within the blade mounting device, and the blade mounting device may define an aperture from which the light beam emanates. The device may further include a focusing lens aligned with said aperture for focusing the light from said light source.

The blade mounting device may include a blade lock washer held on the shaft against the blade, and wherein said light source is mounted within said blade lock washer.

The battery power switch may be mounted within the blade mounting device.

Also featured is a cut alignment device for a rotary saw having a motor which spins a cutting unit which includes a rotary shaft driven by the motor, a circular blade having a central aperture through which the shaft fits, and a blade mounting device for holding the blade on the shaft, the cut alignment device comprising: a battery power source mounted within the blade lock washer; a light source operatively connected to said power source and mounted within the blade lock washer, wherein the blade lock washer defines an aperture from which the light emanates; and a centrifically-engaged switch between said power source and said light source and mounted within the blade lock washer to automatically power said light source when the shaft is spinning; wherein said light source projects a light beam from the aperture directed along the cutting edge of the blade to assist the operator in cutting accurately.

BRIEF DESCRIPTION OF THE DRAWINGS

Other objects, features and advantages will occur to those skilled in the art from the following description of the preferred embodiments, and the accompanying drawings, in which:

FIG. 1A is a front, partially disassembled, view of a preferred embodiment of the cut alignment device of this invention;

FIG. 1B is a cross-sectional view of the device of FIG. 1A taken along line B—B;

FIG. 1D is a side view of the device of FIG. 1A;

DESCRIPTION OF THE PREFERRED EMBODIMENTS

This invention may be accomplished in a cut alignment device for a rotary saw having a motor which spins a cutting unit. The term "cutting unit" as used herein includes a rotary shaft driven by the motor, a circular blade having a central aperture through which the shaft fits, and a blade mounting device for holding the blade on the shaft. The cut alignment device of the invention includes a battery power source with one or more batteries, carried by the cutting unit; and a beam light source, operatively connected to the power source, and also carried by the cutting unit. The result is a light beam which emanates from the cutting unit. The light source is arranged such that the beam intersects the material to be cut along the line along which the saw blade will cut (the cut line). Thus, the operator need only align the light line with a cutting mark in order for the cut to fall directly on the cutting mark.

Figure 1C:
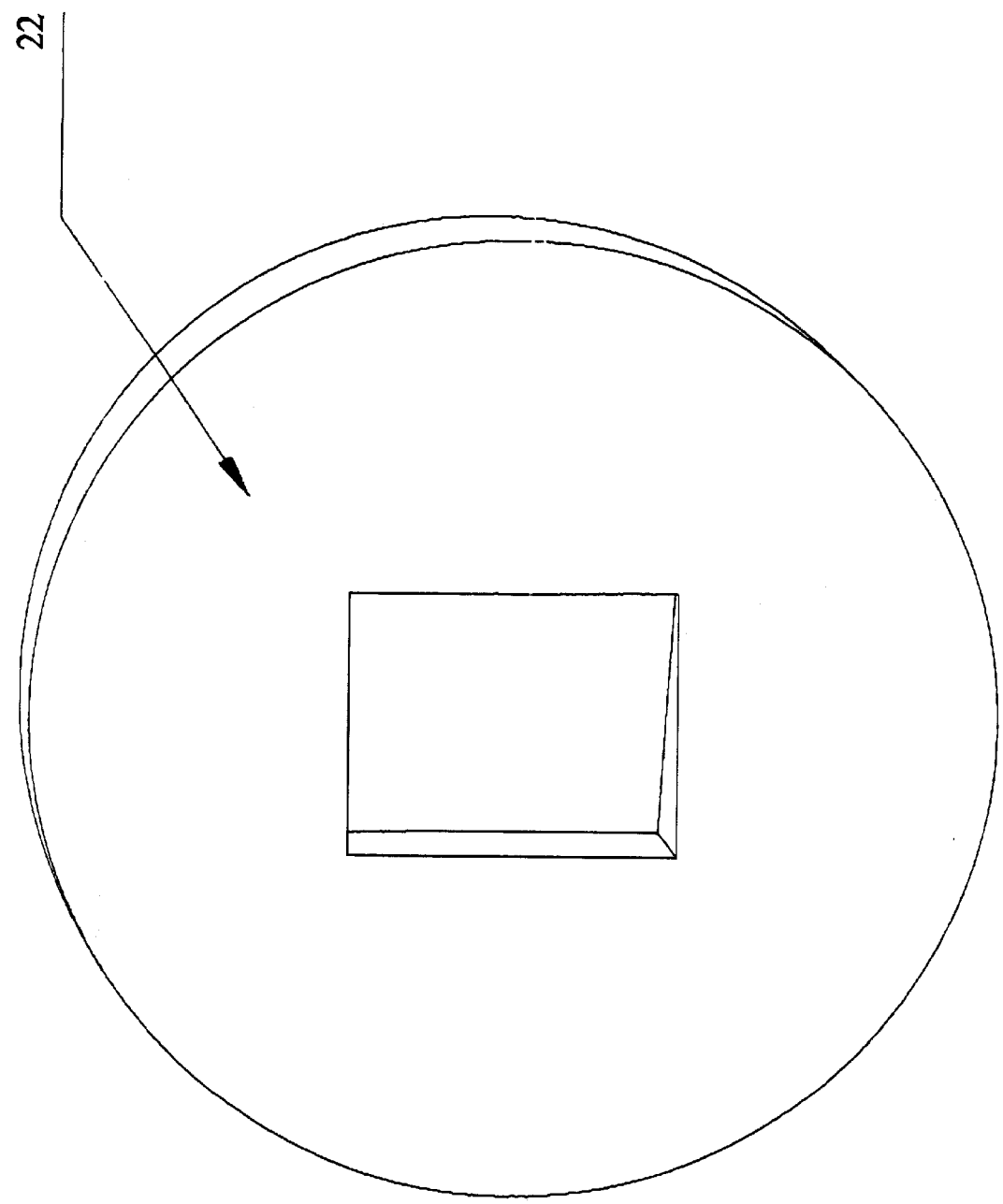
FIG. 1C is a front view of the cover of the device of FIG. 1A.
Figure 2A:
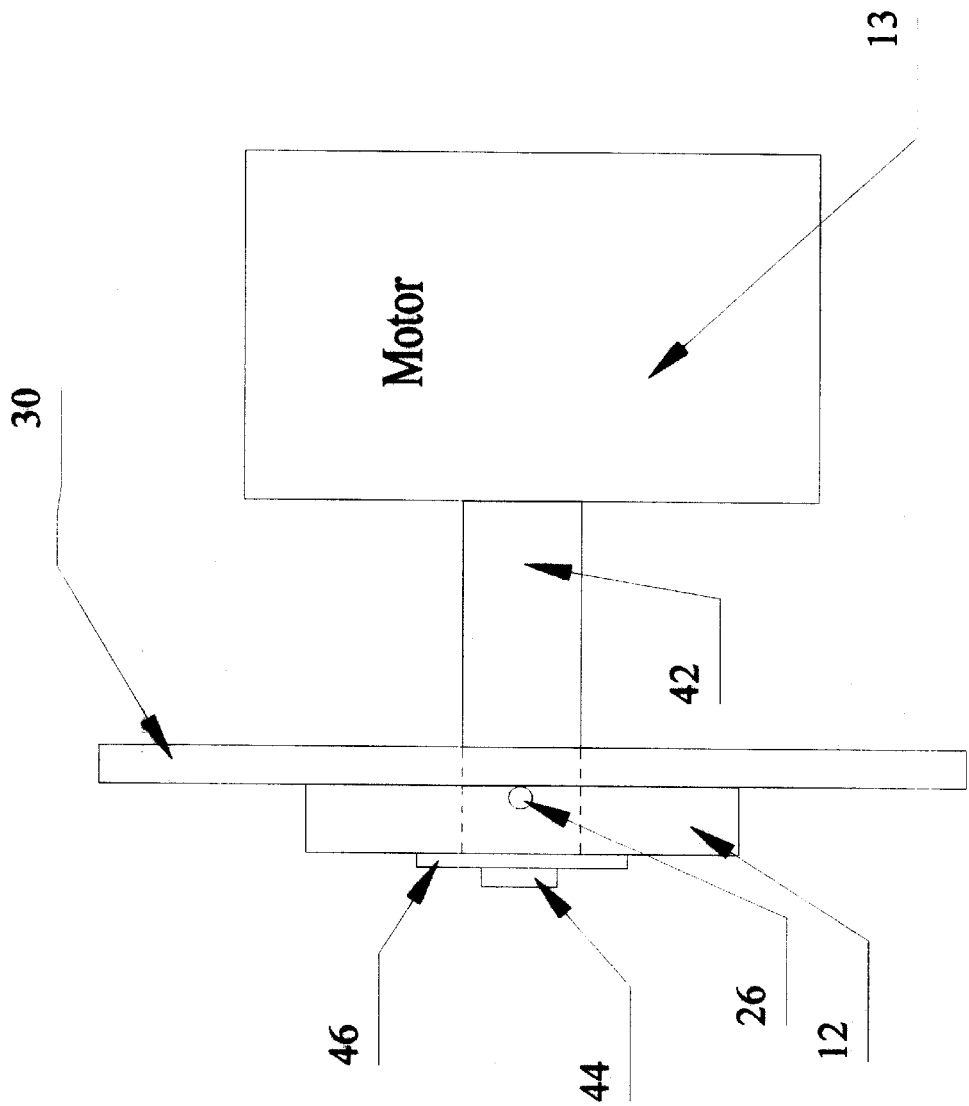
FIG. 2A is a side view of a rotary saw carrying the device of FIG. 1A.
Figure 2B:
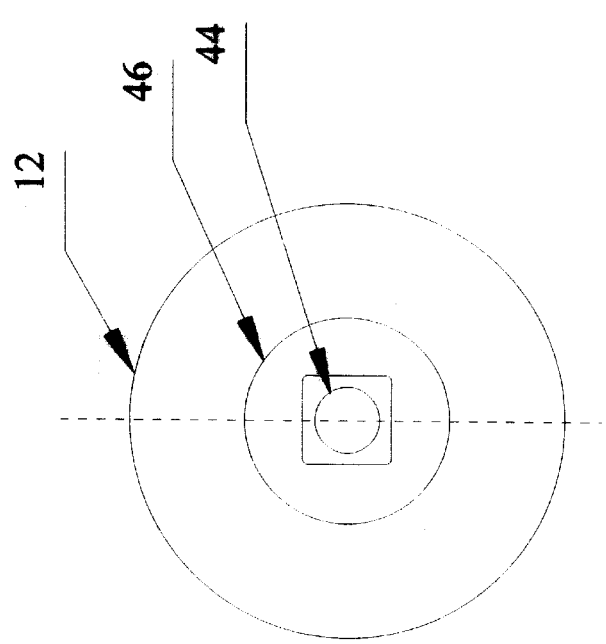
FIG. 2B is a front view of the saw of FIG. 2A.

A preferred embodiment of the cut alignment device of this invention is shown in FIGS. 1 and 2. Hollow annular housing 12 and removable annular cover 22 together are the same diameter and thickness as a typical lock washer which is part of the blade mounting device of rotary saws. The blade mounting device of rotary saws typically includes a blade bolt 44, washer 46, and a lock washer, not shown (FIGS. 2A and 2B), which is replaced in this embodiment with housing 12 having cover 22. Bolt 44 and washer 46 hold housing 12 against blade 30, so that blade 30 can be rotated by shaft 42, which is driven by motor 13.

Housing 12 is preferably made from cast aluminum. Housing 12 carries battery power source 16 comprising three, 1.2 volt hearing aid batteries interconnected by electrical lines 15. Housing 12 also carries laser diode assembly 14, which emits light in the range of 640 to 670 nm through aperture 26 in housing 12 to accomplish a beam light source. Assembly 14 comprises a laser diode 32, which may be a D6605 diode from NVG, Inc. of Hazlehurst, Ga., driven by diode driver circuit board 30, which may be an NS102, also from NVG. A focusing lens, not shown, such as an NVG. 4 from NVG, may be placed within aperture 26, or just inside or outside of the aperture to focus the light as necessary. Assembly 14 and/or this focusing lens is properly aligned such that the light beam emanating from aperture 26 strikes the material to be cut along the blade cut line. The exact alignment depends on the distance of aperture 26 from blade 30, and the distance between aperture 26 and the blade cutting edge. Centrifugally engaged motion activated switch 18 is between power source 16 and laser diode assembly 14 so that laser diode assembly 14 is automatically powered only when housing 12 is spun by shaft 42. Electrical line 17 connects centrifugally engaged motion activated switch 18 to power source 16, and line 19 provides power to assembly 14.

Figure 3:
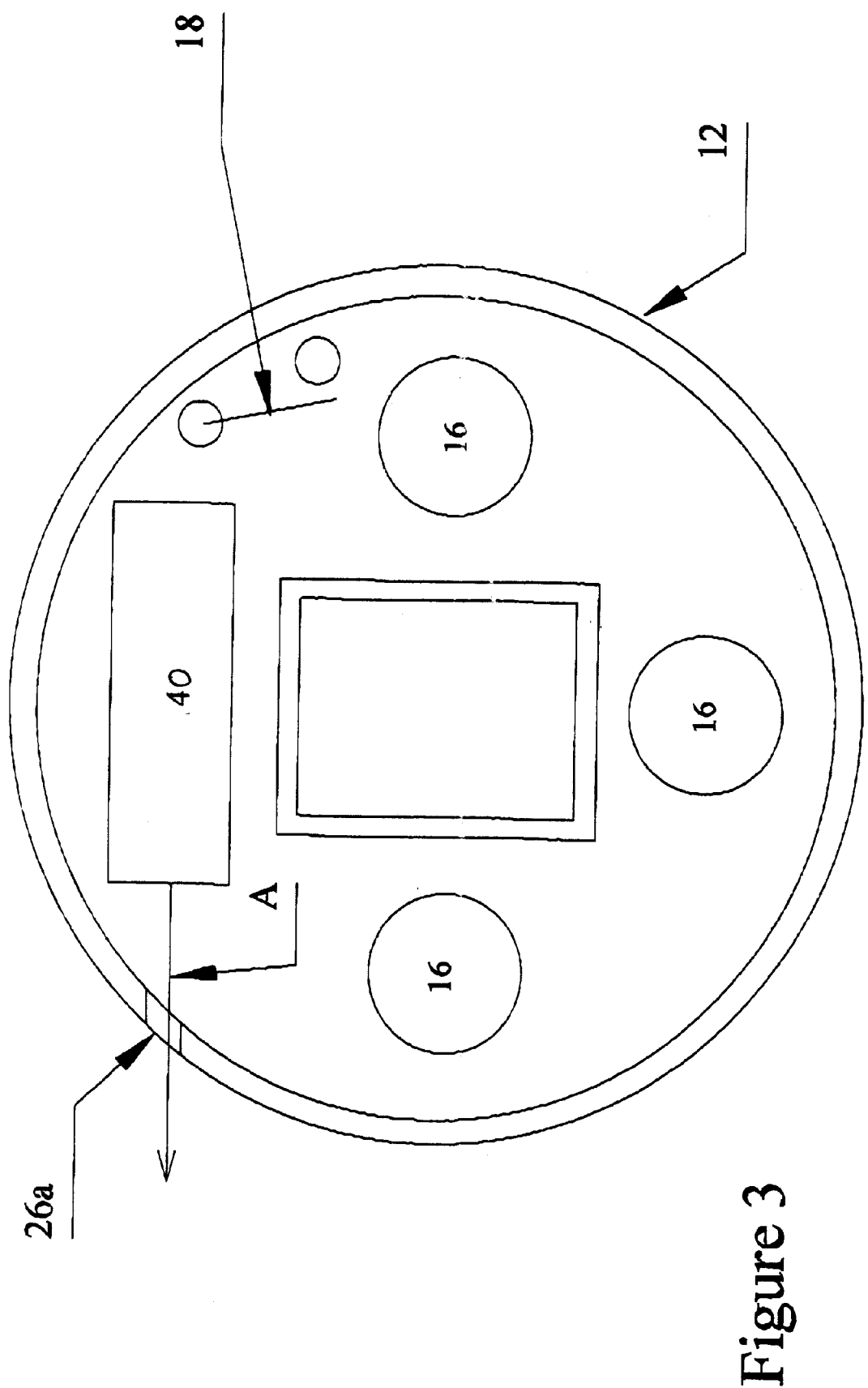
FIG. 3 is a view similar to that of FIG. 1A of an alternative preferred embodiment of the invention.

An alternative embodiment is shown in FIG. 3. The only difference is that cylindrical laser module 40, which may be an MM6605 from NVG replaces diode 32, board 30, and the lens of FIG. 1 with a self-contained unit containing a diode, driver board and focusing lens.

This invention is meant to encompass visible beam light sources other than laser diodes, for example incandescent lamps. Laser diodes are preferred because they are small enough to fit within the interior of a housing having a diameter of 40.8 mm, a thickness of 7.7 mm, and a wall thickness of about 1.5 mm, the dimensions of the preferred embodiment of housing 14 of this invention, yet are bright enough to cast a beam which appears on the material to be cut as a line once the light source is spun. Housing cover 22 is preferably 1 mm thick This invention is also meant to encompass a battery power source and beam light source carried anywhere on the cutting unit of a rotary saw. Since the cutting unit has a fixed, known relationship to the cutting blade, such will enable the light beam to intersect the material to be cut properly in the proper location—along the blade cut line. Thus, the battery and light source can be placed where desired on or in the rotary shaft, the blade, or the blade mounting device.

Although specific features of the invention are shown in some drawings and not others, this is for convenience only, as each feature may be combined with any or all of the other features in accordance with the invention.

Other embodiments will occur to those skilled in the art and are within the following claims.

What is claimed is:

1. A cut alignment device for a rotary saw having a motor which spins a cutting unit, said cutting unit including a rotary shaft driven by the motor, a circular blade having a central aperture through which the shaft fits, and a blade mounting device for holding the blade on the shaft, the cut alignment device comprising:

a battery power source carried by the cutting unit; and a beam light source, operatively connected to said power source, and carried by the cutting unit;

wherein said light source projects a light beam from the cutting unit directed along the cutting edge of the blade to assist the operator in cutting accurately.

2. The cut alignment device of claim 1 further including a switch between said power source and said light source for selectively applying power to said light source.

3. The cut alignment device of claim 2 in which said switch is centrifically engaged to automatically power said light source when the shaft is spinning.

4. The cut alignment device of claim 1 in which said light source is mounted within the blade mounting device, and the blade mounting device defines an aperture from which the light beam emanates.

5. The cut alignment device of claim 4 further including a focusing lens aligned with said aperture for focusing the light from said light source.

6. The cut alignment device of claim 4 in which the blade mounting device includes a blade lock washer held on the shaft against the blade, and wherein said light source is mounted within said blade lock washer.

7. The cut alignment device of claim 1 in which said battery power source is mounted within the blade mounting device.

8. A cut alignment device for a rotary saw having a motor which spins a cutting unit, said cutting unit including a rotary shaft driven by the motor, a circular blade having a central aperture through which the shaft fits, and a blade mounting device for holding the blade on the shaft, the cut alignment device comprising:

a battery power source mounted within the blade mounting device;

a light source operatively connected to said power source and mounted within the blade mounting device, wherein the blade mounting device defines an aperture from which the light emanates; and a centrifically-engaged switch between said power source and said light source and mounted within the blade mounting device to automatically power said light source when the shaft is spinning;

wherein said light source projects a light beam from the aperture directed along the cutting edge of the blade to assist the operator in cutting accurately.

9. The cut alignment device of claim 8 wherein said blade mounting device includes a lock washer, and said power source, light source, and switch are all located within said lock washer.

* * * * *

(12) EX PARTE REEXAMINATION CERTIFICATE (6463rd)

United States Patent
Caluori et al.

(10) Number: US 6,035,757 C1
(45) Certificate Issued: Oct. 7, 2008

(54) ROTARY SAW CUT ALIGNMENT DEVICE

(76) Inventors: Raymond Caluori, 140 Wood Rd., Suite 200, Braintree, MA (US) 02184; James R. Baird, 82 Hillside Ave., Brockton, MA (US) 02402

Reexamination Request:
No. 90/008,174, Aug. 21, 2006

Reexamination Certificate for:
Patent No.: 6,035,757
Issued: Mar. 14, 2000
Appl. No.: 08/990,501
Filed: Dec. 15, 1997

(51) Int. Cl.
*B27B 5/29* (2006.01)

(52) U.S. Cl. ............... 83/520; 30/392; 83/522.23
(58) Field of Classification Search ............ 30/390; 83/520
See application file for complete search history.

(56) References Cited

U.S. PATENT DOCUMENTS

| | | | | |
|---|---|---|---|---|
| 4,856,394 A | * | 8/1989 | Clowers | 83/56 |
| 5,285,708 A | * | 2/1994 | Bosten et al. | 83/520 |
| 5,862,727 A | | 1/1999 | Kelly | |

\* cited by examiner

*Primary Examiner*—Jimmy Foster

(57) ABSTRACT

A cut alignment device for a rotary saw having a motor which spins a cutting unit which includes a rotary shaft driven by the motor, a circular blade having a central aperture through which the shaft fits, and a blade mounting device for holding the blade on the shaft, the cut alignment device including: a battery power source carried by the cutting unit; and a beam light source, operatively connected to this power source, and carried by the cutting unit; wherein the light source projects a light beam from the cutting unit directed along the cutting edge of the blade to assist the operator in cutting accurately.

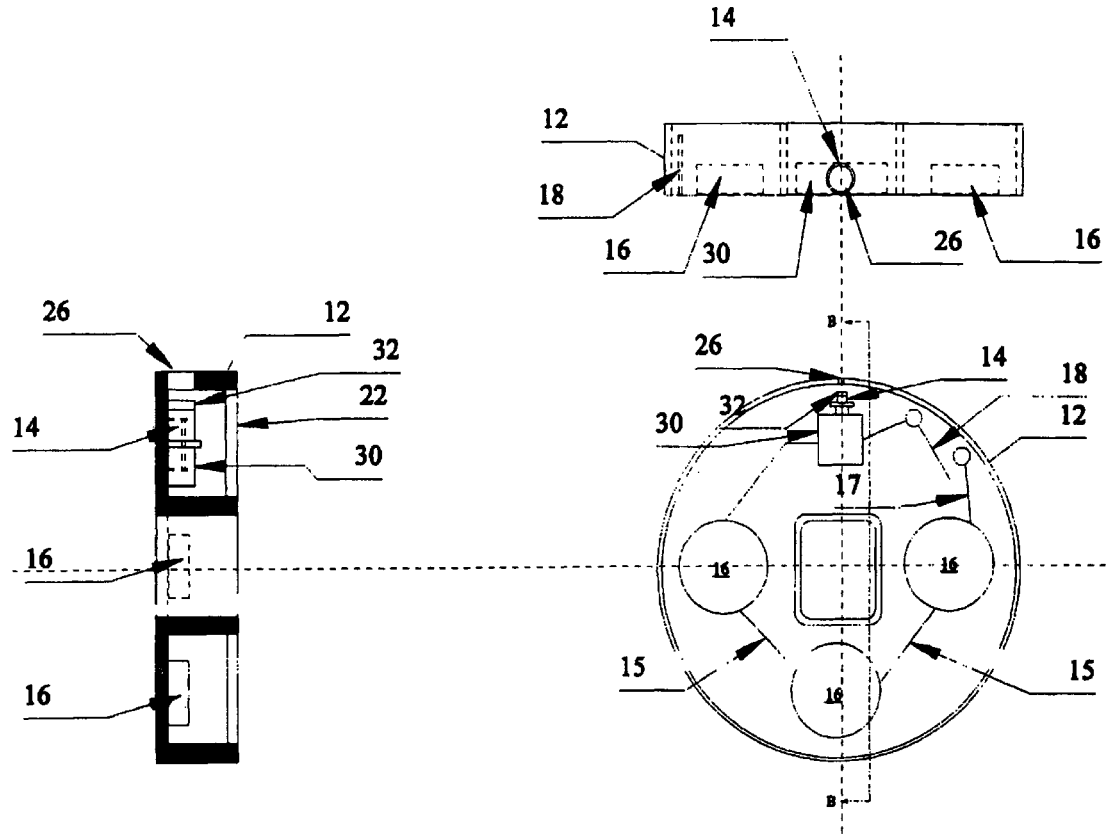

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–9 are cancelled.

* * * * *